May 6, 1952 H. K. MULLER 2,596,086
APPARATUS FOR EVAPORATING AND CONCENTRATING LIQUIDS
Filed March 17, 1951 3 Sheets-Sheet 1

INVENTOR
HANS KARL MULLER
BY
Strauch, Nolan & Diggins
ATTORNEYS

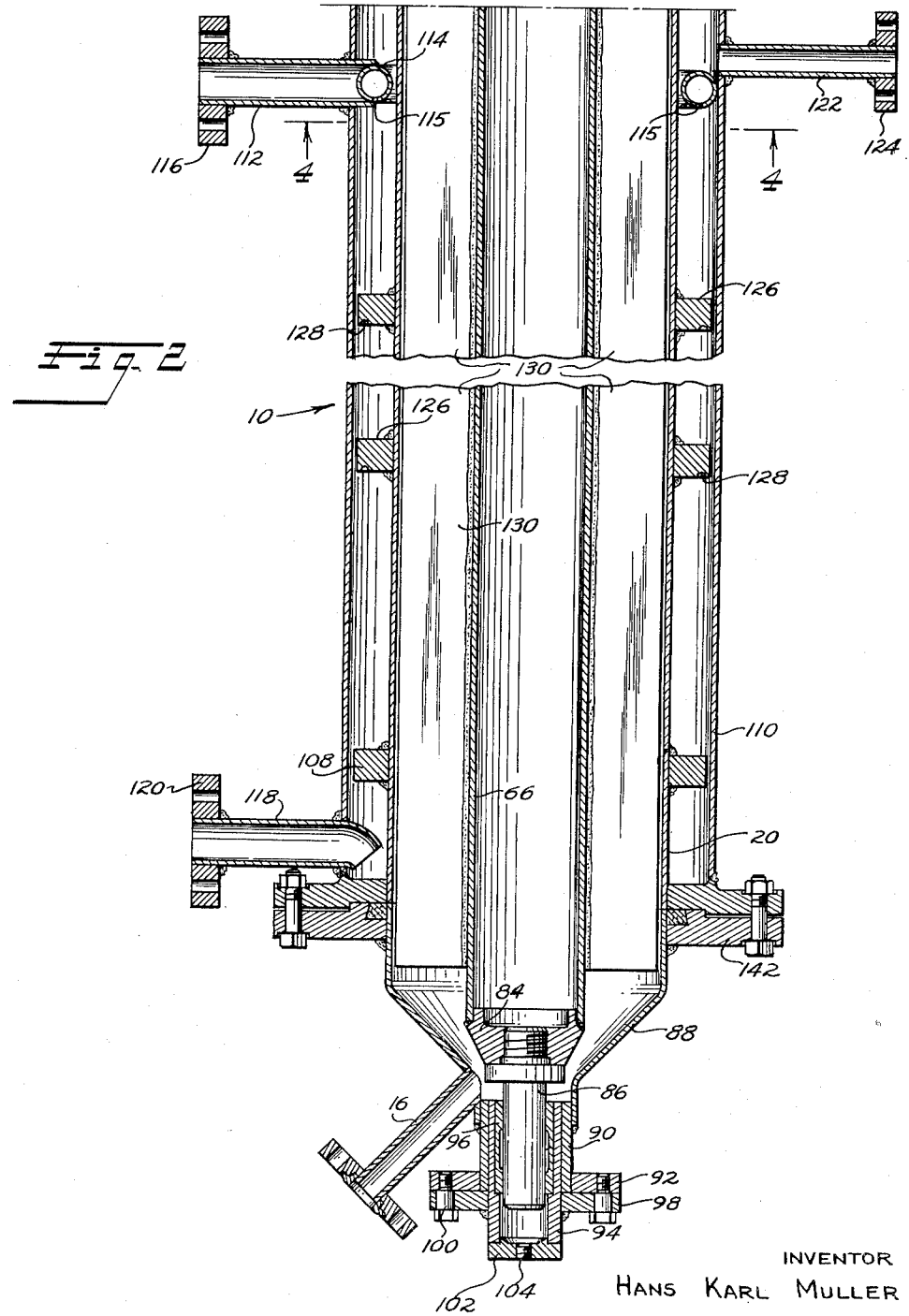

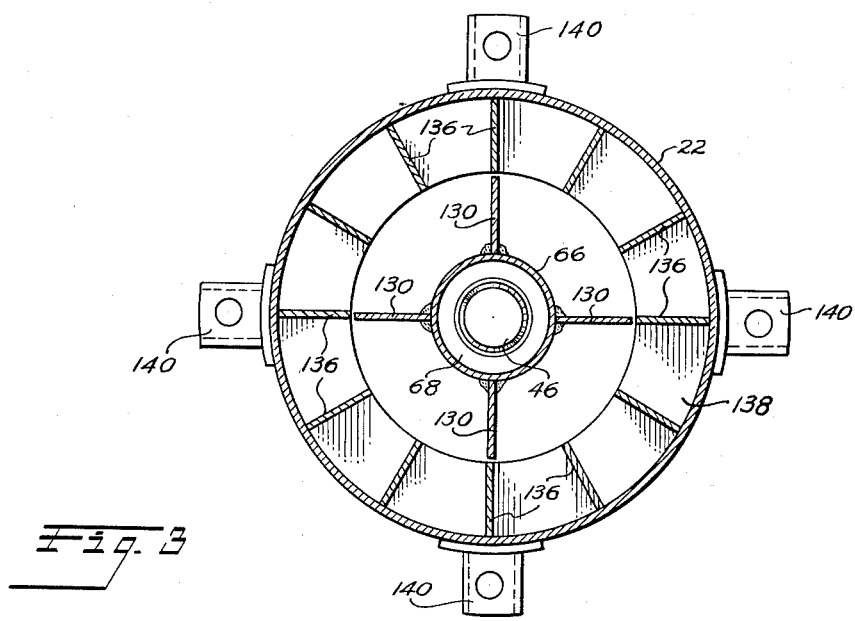
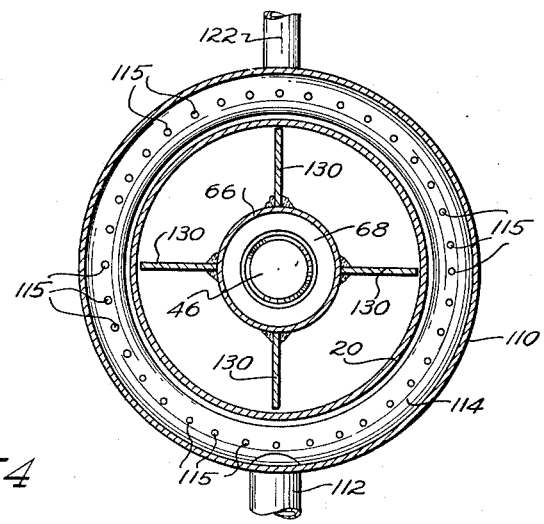
INVENTOR
HANS KARL MULLER

Patented May 6, 1952

2,596,086

UNITED STATES PATENT OFFICE 2,596,086

APPARATUS FOR EVAPORATING AND CONCENTRATING LIQUIDS

Hans Karl Müller, Winterthur, Switzerland, assignor, by mesne assignments, to Rodney Hunt Machine Company, Orange, Mass., a corporation of Massachusetts Application March 17, 1951, Serial No. 216,214
In Switzerland October 30, 1944

Section 1, Public Law 690, August 8, 1946
Patent expires October 30, 1964

10 Claims. (Cl. 159—6)

The present invention relates to processes and apparatus for concentrating or evaporating liquids and separating entrapped liquid from the resulting vapor.

The apparatus of the present invention is of the general type known as a thin film evaporator. Such evaporators consist generally of a heated vertical tube through which the liquid to be concentrated is passed by gravity. A rotary agitator forces the liquid out against the tube wall, spreading the liquid in a thin film and keeping the liquid in rapid movement to insure efficient heat transfer and prevent burning. The liquid flows down the tube wall during evaporation and the concentrate is drawn off from the bottom of the tube. Frequently these evaporators are operated under vacuum conditions to increase the rate of evaporation or to permit evaporation at a lower temperature.

The advantages possible with an ideal thin film evaporator have been recognized. The liquid passes rapidly through the evaporator and is heated for a brief time at relatively low temperature so that flavor, vitamin content, enzyme activity etc. of sensitive food products are not destroyed. Also in an ideal thin film evaporator, all of the liquid receives substantially the same amount of heat for the same time so that the concentrate is substantially uniform.

Prior to the present invention however, these ideal conditions were difficult to obtain, concentrates of sensitive food products were frequently unsatisfactory from a flavor, vitamin content or enzyme activity standpoint, concentrates were non-uniform, and many products such as viscous solutions or suspensions could not be concentrated to a satisfactory degree, if at all.

One of the greatest disadvantages of the evaporators of the prior art lay in the operating losses. The agitator which forced the liquid into a thin film also tended to generate foam and the rapidly moving vapor tended to entrap and carry off droplets of foam and liquid. This liquid was lost with the resulting increase of operating cost and vacuum operation which tended to improve the quality of the product, increased the speed of the vapors and thus tended to increase the losses.

The foam generated in prior art evaporators is not readily discharged and may remain in the evaporator where it will be subjected to prolonged heating which may adversely affect flavor or other qualities.

I have found that the difficulties and defects of the evaporators of the prior art may be overcome and corrected and an evaporator provided which attains or closely approaches the ideal conditions.

One of the objects of the present invention is to provide a method and apparatus for evaporating or concentrating liquids in which losses are held to a minimum.

Another object is to provide a method and apparatus for evaporating or concentrating liquids in which foaming is effectively suppressed.

Another object is to provide a method and apparatus for evaporating or concentrating liquids without subjecting the liquid to excessive temperatures or to prolonged heating.

Another object is to provide a novel method and apparatus for separating entrapped liquid or foam from a gas or vapor.

Another object is to provide a thin film evaporator in which all of the fluid in the evaporator is subject to constant agitation.

Another object is to provide an evaporator or concentrator in which entrapped liquid or foam is separated from the vapor and returned to the evaporator.

A further object is to provide an evaporator in which the liquid is rapidly heated in an efficient manner for a relatively short period of time.

A further object is to provide a simple and efficient thin film evaporator or concentrator in which a single rotor spreads the liquid on the heated evaporator wall and also separates entrapped foam or liquid from the vapor.

These and other objects and advantages reside in novel features of construction, arrangement and combinations of parts and in steps and methods as will hereinafter be more fully set forth and pointed out in the appended claims.

Referring to the drawing:

Figure 2 is a central vertical section of the lower part of the evaporator the upper part of which is shown in Figure 2;

Figure 3 is a section taken on line 3—3 of Figure 1;

Figure 4 is a section taken on line 4—4 of Figure 2.

Figure 1:
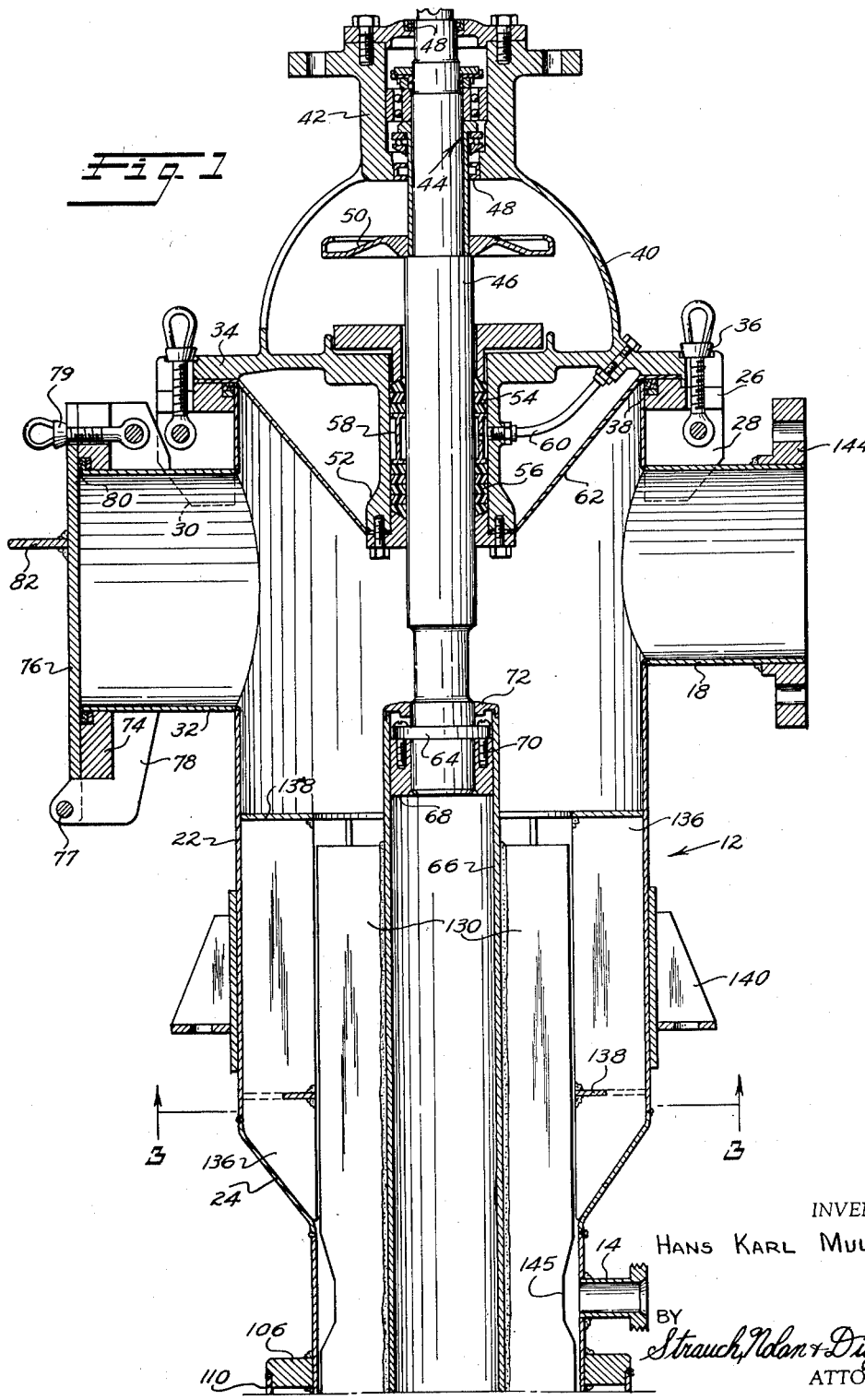
Figure 1 is a central vertical section of the upper part of one form of evaporator or concentrator embodying my invention.

This application is a continuation in part of my copending application Serial No. 770,709, filed August 26, 1947, now forfeited and entitled Apparatus for Evaporating and Concentrating Liquids. That application shows a number of modification and embodiments of my invention in somewhat schematic form but in the present application, for the sake of clarity and simplicity, only a single preferred commercial form of apparatus embodying my invention is illustrated. Various features of the commercial apparatus disclosed but not claimed in this application are described and claimed in application for Letters Patent Serial No. 216,217, filed concurrently herewith by Hans C. Bechtler for Evaporator.

Referring particularly to Figures 1 and 2, my apparatus is of elongated tubular construction and is normally operated in vertical position. The lower portion, indicated generally at 10, is the evaporator portion of the apparatus and the upper portion, indicated generally at 12, is the separator portion. The liquid to be concentrated is introduced through a pipe or fitting 14 which is generally located between the evaporator 10 and concentrator 12 and flows down through the evaporator 10 by gravity. The concentrated liquid is withdrawn through a pipe or fitting 16 at the bottom of the evaporator 10 and vapor is discharged through a pipe or conduit 18 above the separator 12.

The evaporator portion has a wall 20 which is normally cylindrical throughout substantially the entire length of the evaporating chamber. This wall 20 may be tapered to form a frustoconical rather than a cylindrical chamber and, while a cylindrical chamber is ordinarily preferred, it is to be understood that the term "cylindrical" when applied to the evaporator includes also a chamber of tapered or conical form.

The separating chamber 12 may be a continuation of the evaporating chamber or may be larger or smaller than the evaporating chamber 10 but in the preferred form, the separating chamber 12 formed by the wall 22 is of larger diameter than the evaporating chamber and the walls 20 and 22 are connected by a conical wall 24. A reinforcing ring 26 is secured around the upper end of the wall 22, above the pipe or conduit 18, and is reinforced by braces 28 and 30 secured to pipe or conduit 18 and a second pipe 32 respectively. These braces 28 and 30 may be welded to the ring 26 and to the pipes 18 and 32.

A cap 34 is removably secured on the top of wall 22 and ring 26 by screws or bolts 36 and a suitable gasket 38 may be provided in the ring 26 to insure a pressure-tight seal.

An extension 40 on top of the cap 34 carries a bearing housing 42 at its upper end for receiving suitable bearings indicated generally at 44. The specific construction of these bearings forms no part of the present invention but they are preferably of the anti-friction, self-aligning type. A shaft 46 is rotatably mounted in the bearings 44 and the housing 42 is provided with oil seals 48 at its upper and lower ends to prevent leakage of oil along the shaft. The shaft 46 may also be provided with an oil flinger cup 50 between the bearing housing 42 and the cap 34 to afford further protection against the leakage of oil or lubricant along the shaft.

A pressure seal is provided between the shaft 46 and cap 34 and various satisfactory forms of pressure seal are known. In the embodiment illustrated, the cap 34 is formed with a sleeve 52 which surrounds the shaft 46 and carries upper and lower stuffing boxes 54 and 56 respectively. A water seal indicated at 58 may be located between the stuffing boxes 54 and 56. Water is supplied to the seal through a pipe 59 and is discharged through a similar pipe, not shown. A conical wall 62 extends between the joint of wall 22 and cap 34 and the lower end of the sleeve 52 and serves to protect the sleeve 52 and the pressure seal from the hot vapors and also to reinforce the sleeve 52.

The shaft 46 is relatively short and near its lower end and is provided with a flange 64. The rotor 66 of the apparatus could be a solid shaft but is preferably of tubular construction to save weight and cost and an annular ring 68 is rigidly secured in the upper end of the rotor 66 by a force fit or by welding or the like. The lower end of the shaft 46 extends into the center of the ring 68 and the flange 64 is detachably secured to the ring 68 by screws or bolts 70. A cap or cover 72 surrounds the shaft 46 and is secured to the rotor 66 by a force fit, screw threads or the like to protect the connection between shaft 46 and rotor 66 from the vapors.

The connection between shaft 46 and rotor 66 may be reached through the large pipe or handhole 32 which is usually opposite the conduit 18. A reinforcing ring 74 is secured around the outer end of the handhole 32 and a door 76 pivoted at 77 on a bracket 78 is releasably locked by a bolt or screw 79 to close the handhole 32. A gasket 80 may be provided in the ring 74 to form a pressure seal between the handhole 32 and the door 76. A handle 82 may be secured to the door 76 for convenient operation. The handhole 32 is sufficiently large to permit a workman to reach in and disconnect the shaft 46 from the rotor 66 so that the cap 34 and shaft 46 may be removed as a unit for cleaning or repairing the apparatus.

In the preferred form of my apparatus illustrated in the drawing, the rotor 66 extends through the entire length of the separating chamber 12 and evaporating chamber 10 and is sealed at its lower end by a plug 84 which is threaded, welded or otherwise rigidly secured in the rotor. A stub shaft 86 in axial alinement with the shaft 46 is threaded, welded or otherwise firmly secured in the plug 84 and projects downwardly therefrom.

The lower portion of the wall 20 tapers inwardly as indicated at 88 and a sleeve 90 is welded in the reduced bottom wall portion 88 and is provided with a mounting flange 92. A second sleeve 94 carrying a bearing 96 for the stub shaft 86 fits within the sleeve 90 and is provided with a flange 98 which is secured to the mounting flange 92 by screws or bolts 100. The lower end of the sleeve 94 is closed by a plate 102 having a drain plug 104. The sleeves and flanges of this lower bearing mounting have pressure-tight connections and the stub shaft 86 and bearing 96 are cylindrical or slightly tapered to permit ready withdrawal and reinsertion of the shaft 86 in the bearing 96.

Rings 106 and 108 are welded on the outside of the wall 20 at the top and bottom respectively of the evaporating or concentrating chamber portion and a sleeve 110 is welded to the outside of the rings 106 and 108 in spaced relation to the wall 20 to form a jacket for steam, hot water or the like about the evaporating chamber 10.

In the embodiment illustrated, the evaporator is heated by steam through a pipe 112 which extends through and is secured to the sleeve 110. The steam from pipe 112 is preferably fed into an annular pipe 114 which encircles the wall 20 within the sleeve 110 near the top of the jacket and this pipe 114 has a plurality of perforations 115 to direct the steam downward and against the wall 20 to heat the wall 20 uniformly. An attaching flange 116 is welded to the outer end of the pipe or fitting 112 for attachment to a source of steam not shown.

A pipe 118 is secured in an opening in the sleeve 110 at the bottom of the steam jacket to permit removal of the condensed steam and may be attached to a pump or trap, not shown, by a flange 120. When steam is first introduced into jacket, the jacket is filled with air and a pipe 122 may be provided at the top of the jacket to form an air bleed. This pipe 122 has a flange 124 to which a suitable valve, not shown, may be attached and this valve will ordinarily be closed as soon as all of the air in the jacket is replaced by steam. The valve would normally be kept closed during the operation.

Condensation of steam on the wall 20 tends to insulate the wall 20 and impede the transfer of heat. For that reason, it is desirable that the amount of condensate on the wall 20 be kept at a minimum. In order to reduce the insulating effect of condensation, a plurality of annular rings 126 are welded to the wall 20 at spaced intervals between the rings 106 and 108 which form the upper and lower ends of the steam jacket. In the embodiment shown, the rings 126 are of rectangular cross section and have an annular groove 128 in the lower surface near the outer edge. Condensate forming above a ring 126 runs down the wall 20, and over the ring 126 and, because of the projection formed at the outer edge by the groove 128, this condensate drops downward away from the wall 20. The rings 126 reinforce the wall 20 and also serve as fins to enhance the transfer of heat from the steam to the wall 20. It is desirable from both a strength and a heat transfer standpoint to use a number of rings 126 within the steam jacket but the welding of the rings 126 to the wall 20 may distort the wall 20 and, since even small distortions have a deleterious effect, great care must be taken during the welding and usually only a few, relatively widely spaced rings are used. Various other structures for improving the transfer of heat to the wall 20 and minimizing the insulating effect of condensation are shown in my Swiss Patent No. 266,552.

The rotor 66 is imperforate throughout its length and is sealed at both ends. The rotor 66 is smaller than the evaporating chamber 10 formed by the wall 20 and within the chamber 10, the rotor is provided with a plurality of blades or vanes 130 which extend outward from the rotor into close proximity with the wall 20. In the embodiment shown in Figures 1 and 2, there are four equally spaced vanes or blades 20 which project radially outward toward the wall 20. Ordinarily the vanes or blades 130 are flat strips of metal or the like and are preferably rigidly secured along the entire edge to the rotor 66 by welding or the like. It is not essential that the vanes 130 be flat radially nor that they extend longitudinally along the rotor 66 but the flat longitudinal vanes are simpler to make and attach to the rotor and are also lighter in weight.

The vanes 130 are continuous longitudinally and extend from the rotor 66 to close proximity with the wall 20 so that every part of the space between the rotor 66 and wall 20 is acted upon by the vanes 130 when the rotor is rotated. Holes, notches or perforations in the vanes 130 will not prevent satisfactory operation so long as liquid cannot pass from the inlet 14 to the outlet 16 and liquid or foam cannot collect or remain in the steam jacketed portion of the evaporator 10 without being acted upon by the vanes 130.

The clearance between the vanes 130 and the wall 20 is kept as small as possible within reasonable mechanical limitations. Any number of vanes 130 may be used but, because of the small clearances, it is important that the rotor 66 be balanced and the vanes are therefore symmetrically disposed about the rotor.

As shown in Figure 2, the rotor 66 and vanes 130 extend a substantial distance below the bottom of the steam jacket. The liquid at the lower part of the evaporator 10 is usually quite thick and susceptible to burning, especially if any liquid is permitted to collect in this lower portion. The vane portions below the steam jacket keep this thick liquid agitated and by stopping the steam jacket short of the bottom, the thick liquid is protected from excessive heat.

The bearing 96 may be formed of suitable material such as graphite or a rubber-graphite composition and both the bearing and stub shaft 86 of the rotor are exposed to the liquid being concentrated so that the liquid serves as a lubricant. When the bearing is to be cleaned, as for example when the apparatus is to be used to concentrate a different liquid, the plug 104 may be removed and the bearing assembly flushed out with water.

In the embodiment illustrated, the vanes 130 continue along the rotor up into the separating chamber 12 and a grid consisting of a plurality of vertical, radially disposed, spaced baffles 136 and spaced horizontal, annular baffles 138, is positioned in the separating chamber 12 opposite the upper end of the rotor 66 and vanes 130. The lower ends of the baffles 136 are tapered to seat on the conical wall portion 24 and the horizontal and vertical baffles 136 and 138 are preferably welded together so that the entire grid may be inserted or removed from the separating chamber as a unit. There is preferably a clearance between the horizontal baffles 138 and the wall 22 so that liquid can run down the wall 22 without interference and the top horizontal baffle is preferably higher than the upper ends of vanes 130 as shown in Figure 1. The baffles 136 and 138 extend inward into close proximity to the vanes 130 so that the vapor cannot pass through the separating chamber without being acted upon by the vanes.

As pointed out above, the evaporator is operated in a vertical position and mounting brackets 140 and 142 may be secured to the apparatus adjacent the top and bottom respectively for securing the apparatus to suitable supports.

The apparatus is usually operated under a vacuum and a condenser and pump, not shown, which may be of any suitable construction, are attached to the flange 144 on the vapor outlet conduit 18. The condensate is discharged through the pipe 16 and a suitable trap, not shown, which maintains the vacuum.

In operation, the shaft 46 may be provided with a pulley, not shown, above the bearing housing and be driven by a suitable source of power such as an electric motor, not shown. The rotor is rotated rapidly but the exact speed of rotation is not critical. I have found that the operation is successful when the shaft 46 and rotor 66 carrying the vanes 130 are rotated at a speed such that the circumferential speed of the vanes 130 is in the general range of ten to fifteen meters per second.

The liquid to be concentrated is introduced through the pipe 14 which is ordinarily above the steam jacket to avoid burning of the incoming liquid and I prefer to locate the fitting 14 between the evaporating chamber 10 and separating chamber 12 although it may be located in the separating chamber 12. If desired, a plurality of inlet pipes 14 may be symmetrically disposed around the wall 20 to equalize the cooling effect of the liquid and prevent distortion of the apparatus. Ordinarily, notches 145 are provided in the vanes 130 opposite the inlet pipe 14 so that the vanes will not interfere with the introduction of the liquid to be concentrated.

The wall 20 is heated by introducing steam at the desired temperature and pressure and the vanes 130 force the liquid out against the heated wall 20 in a thin film. The liquid flows down the wall 20 by gravity to the bottom of the evaporator housing where it is withdrawn through the pipe 16. Because the vanes 130 are substantially continuous and extend across the entire space between the rotor 66 and the wall 20, all of the liquid passing through the evaporator is being constantly acted upon by the vanes. The centrifugal action of the vanes 130 tends to suppress or prevent the formation of foam and to destroy any foam which may be formed.

As the liquid flows down the wall 20, vapor is driven off and this vapor passes upward between the rotor 66, wall 20 and the vanes 130. The moving vanes 130 strike droplets of foam or liquid entrapped in the vapor and drive these droplets outward against the wall 20.

The rotor 66 is usually of fairly large diameter relative to the diameter of the evaporating chamber 10 and the vanes 130 are relatively narrow since narrow vanes are stronger and more rigid than wide vanes. However, it is desirable that there be sufficient space between the rotor 66 and the wall 20 so as not to impede or unduly restrict the passage of the vapor upward through the evaporating chamber 10. The liquid passing downward through the chamber 10 is spread by the vanes into a thin film on the wall 20 and the vapor passes upward between the rotor 66 and the wall 20 and between the vanes 130.

Because the rotor 66 is imperforate and the vanes 130 are substantially continuous longitudinally and radially, the entire contents of the evaporating chamber 10 is at all times subject to centrifugal force resulting from rotation of the rotor and vanes. This tends to suppress the formation of foam and to force any foam which may be formed outward against the heated wall 20. Likewise, the rising vapor must pass between the vanes which tend to drive entrapped liquid or foam particles outward against the heated wall 20. There is no place within the steam jacked portion of the evaporator 10 where liquid or foam can collect free from the action of the rotating vanes 130.

All of the vapor from the evaporating chamber 10 passes upward through the separating chamber 12 which is normally unheated except by the vapor. Ordinarily the temperature in the separating chamber 12 is insufficient to cause substantial evaporation of the liquid. The purpose of this separating chamber is to remove any unevaporated foam or liquid carried by the vapor so that operating losses may be kept as low as possible. In some instances, it may be necessary or desirable to supply some outside heat to the wall 22 to prevent condensation in the separating chamber. This may occur when the separating chamber must be made very long to ensure extraction of liquids which are not easily separated. Such heat should however be kept at a minimum to avoid burning the separated liquid flowing down the wall 22.

In the preferred form of separator shown, the length and speed of rotation of the rotor 66 and vanes 130 in the separating zone is such that the vanes will move through at least the angular distance between adjacent vanes while vapor is moving the length of the vanes in the separating zone. Thus, every part of the vapor passing through the separating zone is acted upon by a vane 130 moving through the vapor and any entrapped foam or liquid will be driven outward by centrifugal force toward the wall 22. The vertical baffles 136 prevent rotation of the separated foam and liquid within the separating chamber and the horizontal baffles 138 prevent the separated foam and liquid from being carried upward by the vapor. The top horizontal baffle is located above the ends of the vanes 130 to prevent the force resulting from the action of the vanes and the movement of the vapor from carrying foam or liquid over the top of the grid. Any foam and liquid in the vapor in the separating chamber 12 is projected outward against the wall 22 by the vanes 139 and flows down the wall 22, wall 24 and wall 20 back into the evaporating chamber.

While I prefer the separator to include a grid such as that described above, satisfactory separation may be obtained without a grid but when no grid is used, the vanes 130 should extend outward into close proximity with the separator wall so that no substantial amount of vapor can pass through the separator without being acted upon by the vanes. Such a separator would be of substantially the same construction as the evaporator without the evaporator heating system.

It is apparent that my improved evaporator can be used without a separator or with different forms of separator such as, for example, a cyclone separator. Likewise, my improved separator may be used with other forms of evaporator. The evaporator and separator may also be used together as independent units with separate rotors, independently driven. However, by constructing the evaporator and separator sections as a unit and using a single rotor for both, the construction is simplified and the cost of the unit is reduced. The apparatus may be constructed of any suitable material but ordinarily, I prefer to use stainless steel throughout because of its strength and corrosion resistance.

From the foregoing, it will be apparent that I am able to attain the objects of my invention and provide a new and improved method and apparatus for concentrating liquids in which operational losses are minimized. The apparatus is simple in construction and the parts are so made that the apparatus may be readily disassembled for cleaning and sterilizing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An evaporator comprising a chamber having a substantially vertical cylindrical wall, means for heating the central portion of said wall, an imperforate rotor rotatably mounted in said chamber substantially coaxial with said wall, a plurality of vanes radially spaced around said rotor and extending outward therefrom into close proximity with said wall, the lower ends of said vanes extending below said heating means, said vanes being substantially continuous longitudinally and radially, means for rotating said rotor, means at the upper end of said chamber for introducing liquid to be evaporated, and an outlet at the lower end of the chamber below said heating means for unevaporated liquid.

2. Apparatus for evaporating and concentrating liquids comprising an evaporating chamber having a substantially vertical cylindrical wall, means for heating said wall, means for moving liquid through said evaporating chamber against the heated wall in a thin film comprising imperforate evaporator rotor means rotatably mounted in said evaporating chamber substantially coaxial with said wall, a plurality of vanes radially spaced around said rotor means extending longitudinally of said rotor means and radially outward therefrom into close proximity with said wall, said vanes being substantially continuous longitudinally and radially, means for rotating said rotor means, means for introducing liquid to be evaporated at the upper end of the evaporating chamber, said evaporating chamber having an outlet at its upper end for vapor and an outlet at its lower end for unevaporated liquid, a separating chamber having a substantially cylindrical vertical wall connected at its lower end to the outlet at the upper end of said evaporating chamber and means in said separating chamber for removing unevaporated liquid from the vapor comprising an imperforate separator rotor means rotatably mounted in said evaporating chamber substantially coaxial with the separating chamber wall, a plurality of radially spaced vanes on said separator rotor means within said separating chamber extending longitudinally of said separator rotor means and radially outward therefrom toward the separating chamber wall, said vanes being substantially continuous longitudinally and radially, means for rotating said separator rotor means and means for returning the separated liquid to the evaporating chamber.

3. Apparatus for evaporating and concentrating liquids comprising an evaporating chamber having a substantially cylindrical wall, said evaporating chamber having a vapor outlet at one end, a liquid outlet at the other end and a liquid inlet adjacent the vapor outlet, means for heating the wall of the evaporating chamber, means for moving liquid through said evaporation chamber in a thin film against the heated wall, a separating chamber having a cylindrical wall connected at one end to the vapor outlet of said evaporating chamber, said separating chamber having a vapor outlet remote from said evaporator, an imperforate rotor rotatably mounted in said separating chamber substantially coaxial with the wall of said separating chamber, a plurality of radially spaced vanes extending longitudinally of said rotor and projecting outward therefrom toward the wall of said separating chamber, said vanes being substantially continuous longitudinally and radially and means for rotating said rotor.

4. Apparatus for evaporating and concentrating liquids comprising a substantially cylindrical evaporating chamber, a substantially cylindrical separating chamber connected at one end to one end of said evaporating chamber coaxially therewith, said evaporating chamber having a fluid outlet at the end remote from said separating chamber, said separating chamber having a vapor outlet at the end remote from said evaporating chamber, a fluid inlet adjacent the connection between said chambers, means for heating the wall of said evaporating chamber, an imperforate rotor extending through both chambers substantially coaxially therewith, means on said rotor within said evaporating chamber comprising longitudinally and radially continuous vanes extending longitudinally of said shaft and projecting outward therefrom into close proximity with the heated wall for spreading liquid in said evaporating chamber in a thin film on said heated wall, means on said rotor within said separating chamber comprising longitudinally and radially continuous vanes extending longitudinally of said rotor and projecting outward therefrom for driving entrapped liquid in the vapor from said evaporating chamber and outward against the wall of said separating chamber and means for rotating said rotor.

5. Apparatus for evaporating and concentrating liquids comprising a substantially vertically extending tubular member, a heater extending around a lower portion only of said member for heating it to a temperature sufficient to evaporate a liquid applied to its inner surface, said member having an unheated portion which extends above said heater such a distance that its major portion is substantially unheated by same whereby its temperature is substantially lower than that of said lower portion, said member having a vapor outlet in the upper portion of said unheated portion, and having a liquid inlet above said heater, and an agitator supported for rotation within said member and having vanes thereon extending from said outlet to the lower end of said heater, said vanes being substantially continuous from said agitator to said member throughout their lengths extending so close to the inner surface of said lower portion that the liquid from said inlet is spread by said vanes in a thin layer thereon, the inner surface of said unheated portion defining the vapor passage from said lower portion to said outlet, the vapor being moved outwardly against said last mentioned surface right up to said outlet by said vanes, said vanes being spaced further from said last mentioned inner surface than from said inner surface of said lower portion whereby liquid droplets in the vapor passing said inner surface of said unheated portion thrown against said last mentioned surface by said vanes drain freely down same.

6. Apparatus as claimed in claim 5 in which the unheated portion of the tubular member has a larger internal diameter than the heated lower portion thereof, and has substantially vertical baffles extending inwardly from its inner surface towards the vanes for restraining rotation of the liquid droplets thrown out by the vanes.

7. Apparatus as claimed in claim 5 in which the unheated portion of the tubular member has a baffle extending substantially horizontally inwardly from its inner surface just below the vapor outlet to closely adjacent the vanes for restraining the upward movement in the vapor of liquid droplets.

8. Apparatus as claimed in claim 5 in which the unheated portion of the tubular member has a larger internal diameter than the heated lower portion thereof, has a baffle extending substantially horizontally inwardly from its inner surface just below the vapor outlet to closely adjacent the vanes for restraining the upper movement in the vapor of liquid droplets, and has substantially vertical baffles extending inwardly from its inner surface below the horizontally extending baffle towards the vanes for restraining rotation of the liquid droplets thrown out by the vanes.

9. Apparatus for separating entrapped liquid particles from a vapor comprising a housing having a substantially cylindrical wall constituting a conduit through which the vapor is passed, a rotor having an imperforate surface rotatably mounted within said housing for rotation on an axis substantially concentric with the housing wall, said rotor having a substantially smaller diameter than the housing wall thereby providing a space between said rotor and said wall, a plurality of vanes radially spaced about said rotor, each vane being secured along one edge to the rotor and extending outwardly from the rotor toward the wall of said housing, a plurality of radially arranged longitudinal baffles mounted in said housing between said wall and the other edges of said vanes to prevent rotary movement of the separated liquid, and means for rotating said rotor whereby said vanes will strike liquid entrapped in said vapor and drive said liquid outward against the housing wall and against said baffles while permitting the vapor to pass through the housing.

10. Apparatus for separating entrapped liquid particles from a vapor as defined in claim 9 together with a plurality of transverse baffles mounted in said housing between said wall and the said other edges of the vanes to prevent longitudinal movement of the separated liquid.

HANS KARL MÜLLER.

REFERENCES CITED

The following references are of record in the file of this patent:

UNITED STATES PATENTS

| Number | Name | Date |
|---|---|---|
| 642,535 | Snyder | Jan. 30, 1900 |
| 1,258,563 | Harris | Mar. 5, 1918 |
| 1,403,804 | Merrell | Jan. 17, 1922 |
| 1,405,085 | Zahm | Jan. 31, 1922 |
| 1,466,535 | Kyrides | Aug. 28, 1923 |
| 1,703,867 | Burseley et al. | Mar. 5, 1929 |
| 2,029,826 | Macallum | Feb. 4, 1936 |
| 2,453,593 | Putney | Nov. 9, 1948 |
| 2,542,269 | Zahm | Feb. 20, 1951 |
| 2,542,270 | Zahm | Feb. 20, 1951 |
| 2,562,495 | Hulme | July 31, 1951 |